UNITED STATES PATENT OFFICE.

BAILY MARTIN VAN BUREN PRICE, OF ARROYO GRANDE, CALIFORNIA.

VETERINARY REMEDY.

SPECIFICATION forming part of Letters Patent No. 396,111, dated January 15, 1889.

Application filed November 6, 1888. Serial No. 290,126. (No specimens.)

*To all whom it may concern:*

Be it known that I, BAILY MARTIN VAN BUREN PRICE, a citizen of the United States, residing at Arroyo Grande, in the county of San Luis Obispo and State of California, have invented a new and useful Improvement in Veterinary Remedies, of which the following is a specification.

The invention is a composition of matter forming a medical compound to be used in inoculating cattle or other stock animals for the purpose of preventing contagion; and it consists in the following ingredients in the proportions herein stated: Allium, (garlic-root,) twelve grains; phytolacca, (poke-root,) twelve grains; asafetida, twelve grains. Mix the three ingredients together thoroughly, and when perfectly incorporated inclose in a capsule of soluble material, so that it can be inserted in an incision in the animal's skin, which puncture is preferably made in the inner side of the tail, near the root thereof.

It is obvious from the above that the ingredients must be mixed in equal proportions, the above quantities being mentioned as showing the full dose for a steer or other large grown animal.

I am aware that inoculation has been used to prevent the spread of contagious diseases among animals, and such I do not desire to claim, broadly; but I am not aware that the stated ingredients in any proportions have been used for the purpose of inoculation.

Therefore I claim and desire to secure by Letters Patent of the United States—

The herein-described composition of matter, forming a medical compound, to be used in inoculating animals, which compound consists of equal parts of allium, (garlic-root,) phytolacca, (poke-root,) and asafetida, substantially as specified.

In testimony that I claim the foregoing as my own I have hereto affixed my signature in presence of two witnesses.

BAILY MARTIN VAN BUREN PRICE.

Witnesses:
 W. B. PAULDING,
 J. T. RICHARDS.